US012624762B2

(12) United States Patent　　　(10) Patent No.:　US 12,624,762 B2
Glahn　　　　　　　　　　　　　　　　(45) Date of Patent:　May 12, 2026

(54) HYDRAULICALLY SUPPORTED FACE SEAL

(71) Applicant: RTX Corporation, Farmington, CT (US)

(72) Inventor: Jorn A. Glahn, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/280,738

(22) Filed: Jul. 25, 2025

(65) Prior Publication Data

US 2025/0354610 A1　　Nov. 20, 2025

Related U.S. Application Data

(62) Division of application No. 18/081,808, filed on Dec. 15, 2022, now Pat. No. 12,392,412.

(51) Int. Cl.
　　*F16J 15/34*　　　(2006.01)
　　*F01D 11/00*　　　(2006.01)

(52) U.S. Cl.
　　CPC ......... *F16J 15/3448* (2013.01); *F01D 11/003* (2013.01)

(58) Field of Classification Search
　　CPC .... F16J 15/3436; F16J 15/3448; F16J 15/346; F01D 11/003
　　See application file for complete search history.

(56) References Cited

U.S. PATENT DOCUMENTS

| 2,364,133 | A | 12/1944 | De La Roza, Sr. |
| 2,430,918 | A | 11/1947 | Curry |

| 2,738,996 | A | 3/1956 | Andersson |
| 4,180,332 | A | 12/1979 | Twist |
| 5,209,497 | A | 5/1993 | Von Borgen et al. |
| 6,142,477 | A | 11/2000 | Meinzer |
| 10,927,760 | B2 | 2/2021 | Witticki |
| 11,401,833 | B2 * | 8/2022 | Davis .................. F16J 15/3404 |
| 11,473,506 | B2 * | 10/2022 | Unton .................. F16J 15/3488 |
| 11,946,383 | B2 * | 4/2024 | Davis ...................... F16C 33/76 |
| 11,976,560 | B2 | 5/2024 | Gala et al. |
| 12,392,412 | B2 * | 8/2025 | Glahn .................. F01D 25/183 |
| 2013/0136583 | A1 | 5/2013 | Colombo et al. |
| 2018/0003069 | A1 | 1/2018 | Bidkar et al. |
| 2020/0182090 | A1 * | 6/2020 | Davis ...................... F02C 7/06 |
| 2020/0408103 | A1 * | 12/2020 | Gaia ...................... F01D 11/00 |

(Continued)

FOREIGN PATENT DOCUMENTS

DE　　　　19746473 C2　　5/1999

OTHER PUBLICATIONS

Extended European Search Report for European Application No. 23215304.9 mailed May 8, 2024.

*Primary Examiner* — Nicholas L Foster
(74) *Attorney, Agent, or Firm* — Bachman & LaPointe, P.C.

(57)　　　　　　　　ABSTRACT

A hydraulically supported seal including a seal plate operatively coupled with a seal, the seal being supported by a seal carrier within a housing; a piston having a piston shaft, the piston being in operative communication with the seal opposite the seal plate, the piston shaft being disposed through the housing through a piston receiver formed in the housing; a cylinder operatively coupled to the piston opposite the seal; and wherein the piston is hydraulically biased by a hydraulic fluid within the cylinder.

7 Claims, 3 Drawing Sheets

(56) References Cited

U.S. PATENT DOCUMENTS

| | | | |
|---|---|---|---|
| 2022/0154649 A1* | 5/2022 | Unton | F02C 7/28 |
| 2022/0205540 A1 | 6/2022 | Wasser et al. | |
| 2022/0325633 A1* | 10/2022 | Davis | F16J 15/3404 |
| 2024/0200662 A1* | 6/2024 | Glahn | F01D 25/183 |

* cited by examiner

HYDRAULICALLY SUPPORTED FACE SEAL

This application is a divisional of U.S. patent application Ser. No. 18/061,808, filed Dec. 15, 2022.

BACKGROUND

The present disclosure is directed to a high pressure cylinder integrated into a housing for a face seal to improve sealing with use of a very high pressure CO2 working fluid system.

Waste heat recovery systems are configured to capture the thermal energy in the engine exhaust and transfer the thermal energy to a working fluid, such as supercritical CO2 or air. The working fluid is then sent through a thermodynamic cycle to produce power in the form of electricity or mechanical motion. This power is used to supplement engine thrust.

The use of supercritical CO2 as a working fluid in the waste heat recovery system requires very high pressure systems and resultant pressure differentials across sealing surfaces (1,000 psi).

As seen in FIGS. 1 to 3 typical face seals include a seal plate interacting with a carbon seal supported by a carbon carrier in a housing. FIG. 1 shows a bearing compartment with a face seal highlighted. FIG. 2 and FIG. 3 show a seal plate A proximate a low pressure $P_{low}$ section. A carbon seal B is adjacent the seal plate A on the high pressure $P_{high}$ section. A carbon carrier C supports the carbon seal B. A damper D is coupled to a biasing member or spring S. The carbon seal B is biased by the mechanical spring S, such as a bellows spring or coil spring. The forces mustered by the bellows spring have a fixed limited range (100-150 psi) and can degrade over time.

What is needed is an improved face seal system capable of withstanding very high pressure differentials.

SUMMARY

In accordance with the present disclosure, there is provided a hydraulically supported seal comprising a seal plate operatively coupled with a seal, the seal being supported by a seal carrier within a housing; a piston having a piston shaft, the piston being in operative communication with the seal opposite the seal plate, the piston shaft being disposed through the housing through a piston receiver formed in the housing; a cylinder operatively coupled to the piston opposite the seal; and wherein the piston is hydraulically biased by a hydraulic fluid within the cylinder.

A further embodiment of any of the foregoing embodiments may additionally and/or alternatively include the seal plate is between a high-pressure section and a low-pressure section opposite the high-pressure section.

A further embodiment of any of the foregoing embodiments may additionally and/or alternatively include the seal is adjacent the seal plate on the low-pressure side of the seal plate.

A further embodiment of any of the foregoing embodiments may additionally and/or alternatively include the piston shaft within the piston receiver is sealed by a non-rotating secondary seal.

A further embodiment of any of the foregoing embodiments may additionally and/or alternatively include the hydraulically supported seal further comprising a hydraulic circuit fluidly coupled to the cylinder, the hydraulic circuit configured to pressurize the cylinder.

A further embodiment of any of the foregoing embodiments may additionally and/or alternatively include secondary seals seal the piston and the cylinder interface.

A further embodiment of any of the foregoing embodiments may additionally and/or alternatively include the hydraulically supported seal further comprising a controller employed to maintain the hydraulic circuit pressure which maintains a seal face integrity.

In accordance with the present disclosure, there is provided a system for hydraulically supporting a seal in a supercritical carbon dioxide (sCO2) turbomachine comprising a supercritical carbon dioxide turbomachine seal plate operatively coupled with a seal, the seal being supported by a seal carrier within a housing located in the supercritical carbon dioxide turbomachine; a piston having a piston shaft, the piston being in operative communication with the seal opposite the seal plate, the piston shaft being disposed through the housing through a piston receiver formed in the housing; a cylinder operatively coupled to the piston opposite the seal; and a hydraulic circuit containing a hydraulic fluid fluidly coupled to the cylinder, the hydraulic circuit configured to pressurize the cylinder, wherein the piston is hydraulically biased by the hydraulic fluid within the cylinder.

A further embodiment of any of the foregoing embodiments may additionally and/or alternatively include the system for hydraulically supporting a seal in a supercritical carbon dioxide turbomachine, further comprising a controller employed to maintain the hydraulic circuit pressure which maintains a seal face integrity.

A further embodiment of any of the foregoing embodiments may additionally and/or alternatively include the seal plate is between a high-pressure section and a low-pressure section.

A further embodiment of any of the foregoing embodiments may additionally and/or alternatively include the hydraulic circuit can be pressurized by a pump.

A further embodiment of any of the foregoing embodiments may additionally and/or alternatively include the system for hydraulically supporting a seal in a supercritical carbon dioxide turbomachine, further comprising a variable restrictor fluidly coupled to the hydraulic circuit and employed to regulate pressure in the hydraulic circuit.

A further embodiment of any of the foregoing embodiments may additionally and/or alternatively include the system for hydraulically supporting a seal in a supercritical carbon dioxide turbomachine, further comprising a controller operatively coupled to the hydraulic circuit and employed to maintain the hydraulic circuit pressure which maintains a sealing force.

In accordance with the present disclosure, there is provided a process for hydraulically supporting a seal comprising operatively coupling a seal plate with a seal; supporting the seal with a seal carrier within a housing; providing a piston having a piston shaft, the piston being in operative communication with the seal opposite the seal plate, disposing the piston shaft through a piston receiver formed in the housing; operatively coupling a cylinder to the piston opposite the seal; fluidly coupling a hydraulic circuit containing a hydraulic fluid to the cylinder; and hydraulically biasing the piston with the hydraulic fluid within the cylinder.

A further embodiment of any of the foregoing embodiments may additionally and/or alternatively include the process further comprising operatively coupling a controller with the hydraulic circuit; and employing the controller to maintain the hydraulic circuit pressure which maintains a seal face integrity.

A further embodiment of any of the foregoing embodiments may additionally and/or alternatively include the process further comprising sealing the interface between the piston and the cylinder with secondary seals.

A further embodiment of any of the foregoing embodiments may additionally and/or alternatively include the process further comprising fluidly coupling a variable restrictor to the hydraulic circuit; and employing the variable restrictor to regulate pressure in the hydraulic circuit.

A further embodiment of any of the foregoing embodiments may additionally and/or alternatively include the process further comprising pressurizing the hydraulic circuit with a pump.

A further embodiment of any of the foregoing embodiments may additionally and/or alternatively include wherein the controller can be in communication with a supervisory controller.

A further embodiment of any of the foregoing embodiments may additionally and/or alternatively include the process further comprising providing engine operational conditions as control input to the hydraulic circuit to maintain the sealing forces acting on the carbon seal throughout at least one engine operating cycle.

Other details of the hydraulically supported seal are set forth in the following detailed description and the accompanying drawings wherein like reference numerals depict like elements.

DETAILED DESCRIPTION

Figures 1, 2, 3:
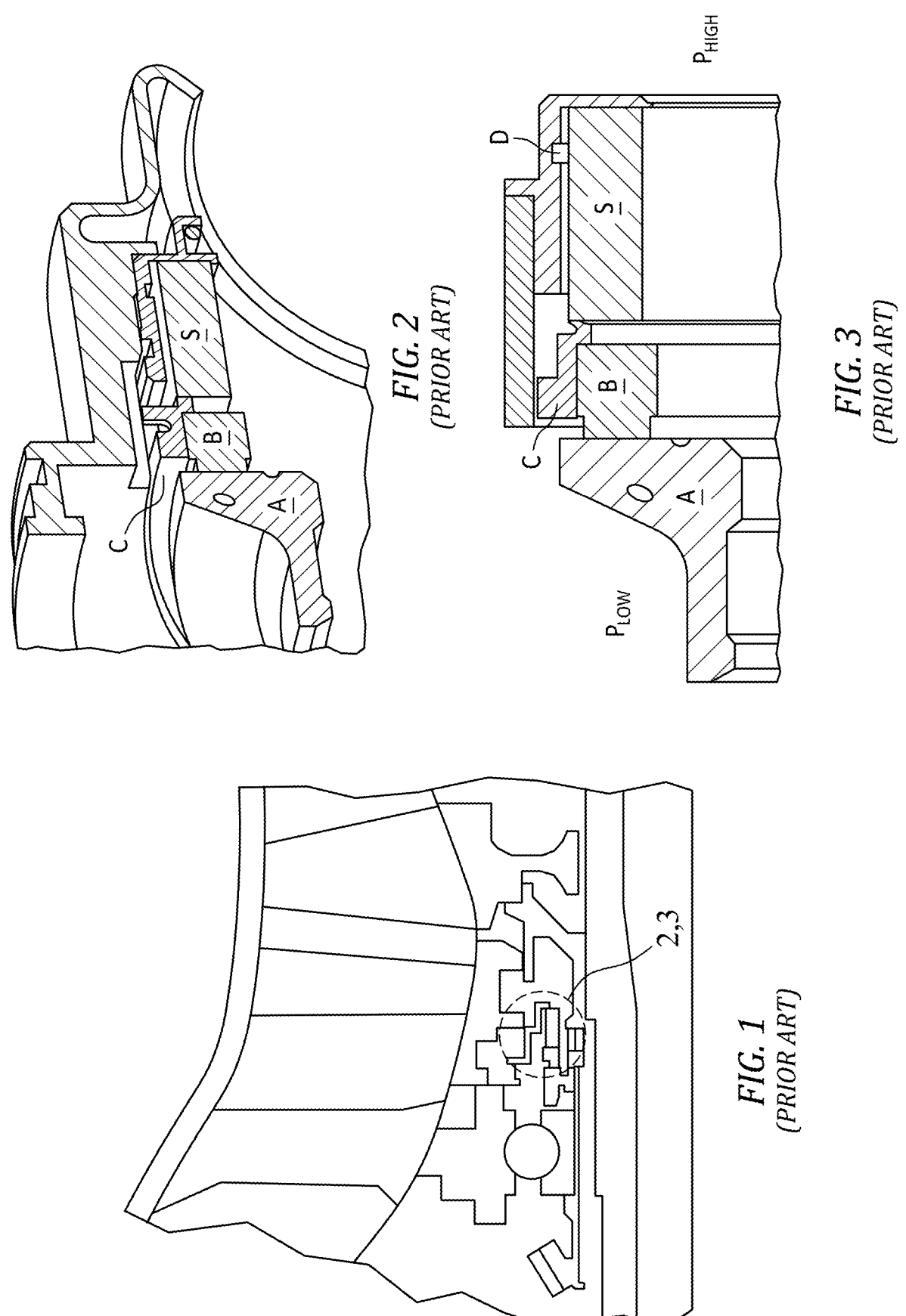
FIG. 1 is a schematic exemplary bearing compartment.
FIG. 2 is a partial cross section view of a face seal.
FIG. 3 is a cross section view of the face seal.
Figure 4:
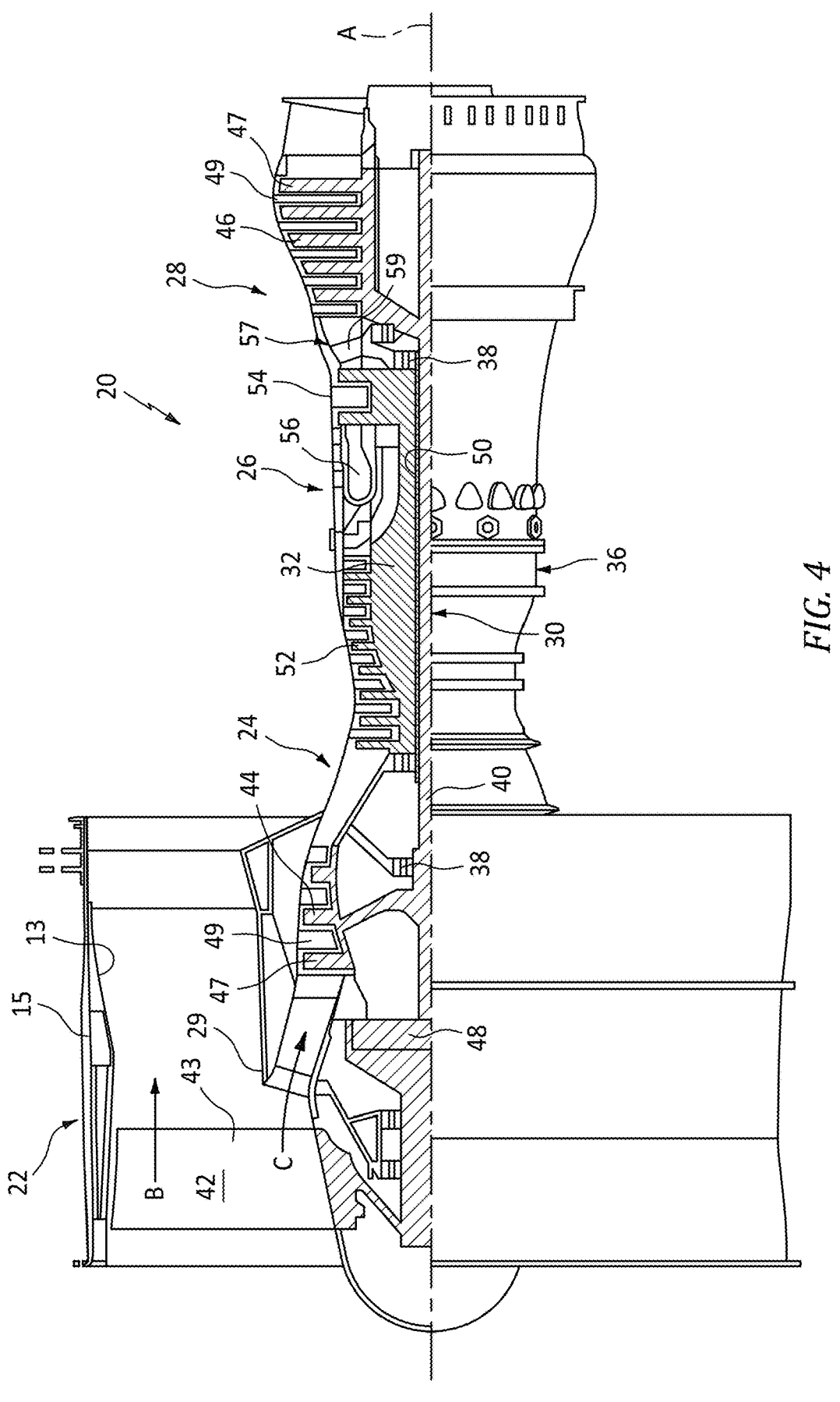
FIG. 4 is a cross section view of an exemplary gas turbine engine.

FIG. 4 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of pounds-mass per hour lbm/hr of fuel flow rate being burned divided by pounds-force lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "LOW corrected fan tip speed" is the actual fan tip speed in ft/sec divided by an industry standard temperature correction of $[(\text{Tram} \,^\circ \text{R})/(518.7^\circ \text{R})]^{0.5}$. The "low corrected fan tip speed" can be less than or equal to 1150.0 ft/second (350.5 meters/second), and greater than or equal to 1000.0 ft/second (304.8 meters/second).

Figure 5:
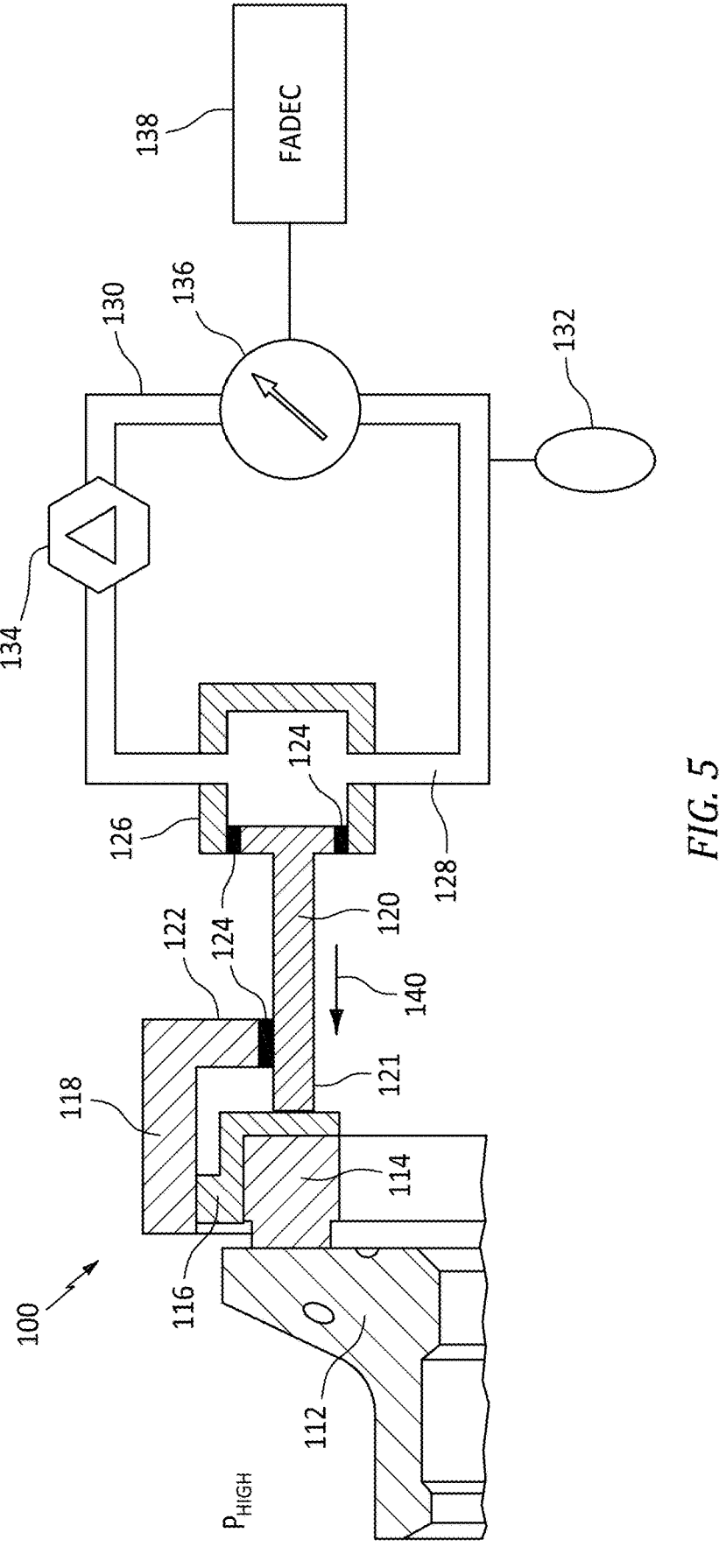
FIG. 5 is a cross section schematic of an exemplary face seal with hydraulically supported seal.

Referring now to FIG. 5, there is illustrated an exemplary hydraulically supported seal 100. The hydraulically supported seal 10 includes a seal plate 12. The seal plate 112 is proximate a high pressure section $P_{high}$. On the opposite side of the high pressure section $P_{high}$ is a low pressure section $P_{low}$ such as ambient pressure. The pressure differential between $P_{high}$ and $P_{low}$ can be one thousand pounds per square inch (1,000 psi). A seal 114 is adjacent the seal plate 112 on the low pressure side of the seal plate 112. A seal carrier 116 is coupled to the seal 114 and supporting the seal 114 within a housing 118.

A piston 120 is in operative communication with the seal 114. The piston 120 includes a shaft 121 that is disposed through the housing 118 through a piston receiver 122. The piston receiver 122 can be sealed by a non-rotating secondary seal 124. The piston 120 is coupled to a cylinder 126 opposite the seal 114. Secondary seals 124 can also seal the piston 120 and cylinder 126 interface.

The piston 120 is hydraulically biased by a hydraulic fluid 128 within the cylinder 126. The cylinder 126 can be pressurized by a regulated hydraulic circuit 130.

The hydraulic circuit 130 can be pressurized by a variety of pumps 132, such as a gearbox driven pump, variable speed pump, variable displacement pump, and the like. In an exemplary embodiment, a variable restrictor 134 can be employed to regulate pressure in the hydraulic circuit 130.

A controller 136 can be employed to maintain the hydraulic circuit 130 pressure which then maintains the seal face integrity. The controller 136 can be in communication with a supervisory controller 138 such as a Full Authority Digital Engine Controller (FADEC). Engine operational conditions can provide control input to the hydraulic circuit 130 to maintain the sealing forces 140 acting on the carbon seal 114 operational throughout the various engine operating cycles. In an exemplary embodiment, a supercritical carbon dioxide (sCO2) turbomachine can be employed along with the disclose hydraulically supported seal.

A technical advantage of the disclosed hydraulically supported seal includes the capacity to increase or decrease the sealing forces to maintain a balanced seal.

Another technical advantage of the disclosed hydraulically supported seal includes the capacity to apply high sealing forces to the seal to maintain seal integrity.

Another technical advantage of the disclosed hydraulically supported seal includes separation of the high-pressure supercritical CO2 from hydraulic fluid, thus eliminating cross-contamination.

There has been provided a hydraulically supported seal. While the hydraulically supported seal has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process for hydraulically supporting a seal in a gas turbine engine, the process comprising:
   operatively coupling a seal plate with a seal;
   supporting the seal with a seal carrier within a housing;
   providing a piston having a piston shaft, the piston being in operative communication with the seal opposite the seal plate;
   disposing the piston shaft through a piston receiver formed in the housing;
   operatively coupling a cylinder to the piston opposite the seal;
   fluidly coupling a hydraulic circuit containing a hydraulic fluid to the cylinder; and
   hydraulically biasing the piston with the hydraulic fluid within the cylinder.

2. The process of claim 1, further comprising:
   operatively coupling a controller with the hydraulic circuit; and
   employing the controller to maintain a hydraulic circuit pressure which maintains a seal face integrity.

3. The process of claim 1, further comprising:
   sealing the interface between the piston and the cylinder with secondary seals.

4. The process of claim 1, further comprising: fluidly coupling a variable restrictor to the hydraulic circuit; and
   employing the variable restrictor to regulate pressure in the hydraulic circuit.

5. The process of claim 1, further comprising: pressurizing the hydraulic circuit with a pump.

6. The process of claim 2, wherein the controller is in communication with a supervisory controller.

7. The process of claim 2, further comprising:

providing engine operational conditions as control input to the hydraulic circuit to maintain sealing forces acting on a carbon seal throughout at least one engine operating cycle.

* * * * *